United States Patent [19]

Stolov

[11] 4,368,963
[45] Jan. 18, 1983

[54] MULTICOLOR IMAGE OR PICTURE PROJECTING SYSTEM USING ELECTRONICALLY CONTROLLED SLIDES

[76] Inventor: Michael Stolov, 25 Hapoel St., Nof-Yam, Herzlia, Israel

[21] Appl. No.: 38,844

[22] Filed: May 14, 1979

Related U.S. Application Data

[63] Continuation-in-part of Ser. No. 943,982, Dec. 11, 1978, Pat. No. 4,222,641.

[30] Foreign Application Priority Data

Jun. 29, 1978 [IL] Israel .......................... 55032

[51] Int. Cl.³ .................... G02F 1/13; G03B 21/10; G03B 21/26
[52] U.S. Cl. .................... 353/31; 350/331 R; 350/331 T; 350/334; 350/349; 353/53; 353/84; 353/120; 353/122; 358/61
[58] Field of Search .................... 353/30, 31, 53, 120, 353/122, 84, 121; 350/331 R, 331 T, 334, 349; 358/59, 61, 902

[56] References Cited

U.S. PATENT DOCUMENTS

| | | | |
|---|---|---|---|
| 3,152,509 | 10/1964 | Zillmer | 353/53 |
| 3,796,484 | 3/1974 | Forster | 353/25 |
| 3,844,650 | 10/1974 | Nicholson et al. | 353/122 |
| 3,895,866 | 7/1975 | de Quervain et al. | 353/120 |
| 3,944,351 | 3/1976 | Ito et al. | 353/31 |
| 4,094,058 | 6/1978 | Yasutake et al. | 350/331 R |
| 4,116,543 | 9/1978 | Stein | 350/333 |
| 4,119,842 | 10/1978 | Hayden et al. | 350/331 T |
| 4,222,641 | 9/1980 | Stolov | 353/88 |

*Primary Examiner*—Steven L. Stephan
*Attorney, Agent, or Firm*—Browdy and Neimark

[57] ABSTRACT

A large image or picture system includes a flat screen, on which is projected pictures from three small liquid crystal display panels behind or in front of which are disposed respectively three filters of the colors red, green and blue. Three light sources are provided behind the respective liquid crystal panels, while three lenses are provided respectively in front of the liquid crystal panels. The lenses project three partial pictures in three different colors onto a single screen, creating a complete multicolored picture. For high capability of information of the pictures, large liquid crystal panels are proposed, which are assembled from many small liquid crystal cells, allowing rapid switching and multiplexing. Changing the frequency of the voltage applied to the liquid crystal cells results in a modulation of the light intensity of the individual parts of the picture, resulting in artistic pictures, like photographs.

11 Claims, 4 Drawing Figures

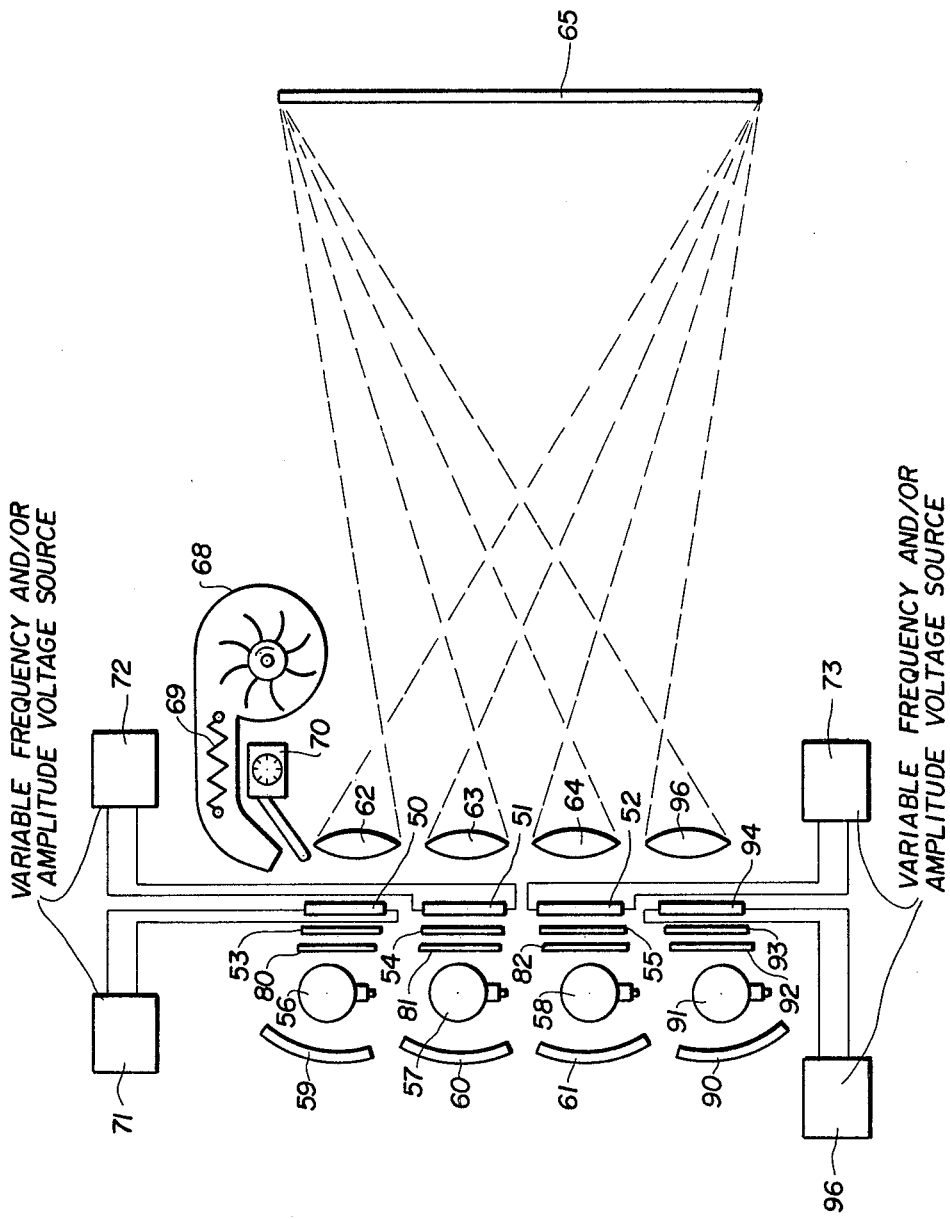

4,368,963

MULTICOLOR IMAGE OR PICTURE PROJECTING SYSTEM USING ELECTRONICALLY CONTROLLED SLIDES

REFERENCE TO RELATED APPLICATIONS

This application is a continuation-in-part of Ser. No. 943,982 filed on Dec. 11, 1978, in the name of Michael Stolov and entitled "An Image or Picture Projection System Using Electronically Controlled Slides," this prior application being incorporated herein in its entirety by reference; and now issued as U.S. Pat. No. 4,222,641 on Sept. 16, 1980.

BACKGROUND OF THE INVENTION

This invention relates to a multicolor image or picture projection system providing a large, bright projection of pictures with very high resolution of the colors, by electronic techniques with very small energy consumption by the electronic circuitry. More particularly, the present invention provides a possibility to obtain very large liquid crystal panels with high capability of information, suitable for rapid switching and multiplexing.

SUMMARY OF THE INVENTION

The present invention provides a possibility of obtaining very large, bright and colored moving pictures, with very high resolution of the colors. The invention can be applied in high quality professional devices, as multicolor data and graphic screens associated with computers. Radar apparatus, advertising displays, apparatus for providing theatre backgrounds, and in many other art areas where image or picture projection systems may be used.

In accordance with the present invention, a very large liquid crystal panel suitable for rapid switching and for multiplexing can be provided.

BRIEF DESCRIPTION OF THE DRAWINGS

FIG. 4 is a view similar to FIG. 1 showing a similar system using four liquid crystal panels and projecting subsystems.

DESCRIPTION OF THE PREFERRED EMBODIMENTS

Figure 1:
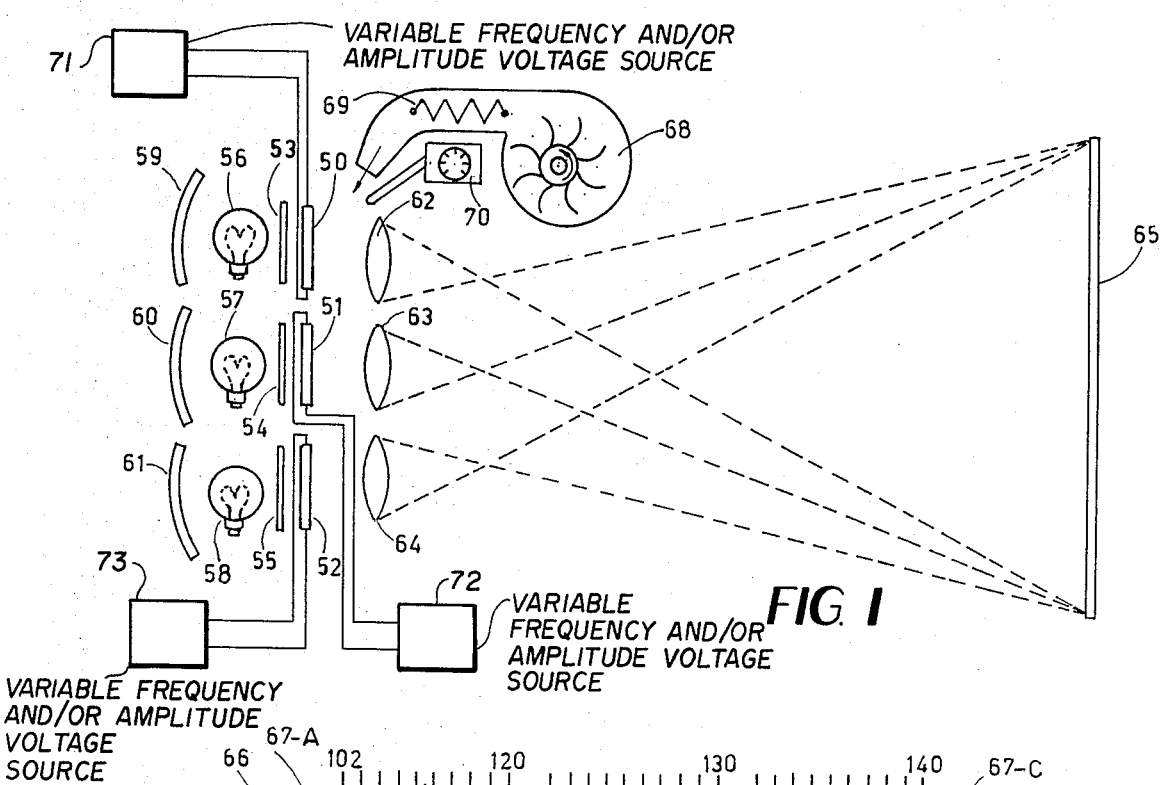
FIG. 1 shows an exemplary embodiment of an image or picture projecting system for projecting bright, multicolor figures from three small liquid crystal panels onto a large screen according to the present invention.

The exemplary embodiment of a projection system, according to the present invention as illustrated in FIG. 1, includes a large screen 65, three lenses 62, 63, and 64, three identical liquid crystal display panels 50, 51 and 52, three color filters 53, 54 and 55 respectively of the colors red green and blue and three light sources 56, 57 and 58, with the corresponding reflectors 59, 60 and 61. All three of the liquid crystal panels 50, 51 and 52, have the same pattern and they are respectively focused by the lenses 62, 63 and 64 exactly in the same place onto the screen 65.

The composite portions of the image or picture which must be in red color, is addressed by energizing the liquid crystal panel 50, behind which is disposed the red filter 53, which is a red transparent glass or plastic. The color filter 53 could alternatively be disposed in front of the liquid crystal panel 50, or even in front of the lens 62. The composite portions of the image or picture, which must be in green color, is addressed to the liquid crystal panel 51, associated with the green filter 54, and the composite portions of the image or picture which must be in blue color, is addressed to the liquid crystal panel 52 associated with the blue filter 55. The green and blue filters 54, 55 could, as with the red filter 53, be respectively, alternatively placed either in front of its associated crystal panel 51, 52 or in front of its respective associated light source 57, 58. Means are also provided to diffuse the light from each source 56,57 and 58 before it strikes a respective panel 50,51, or 52 but the diffusers have been omitted to avoid cluttering FIG. 1. The elements 45, shown in FIG. 9 and described at the top of col. 2 of my prior patent U.S. Pat. No. 4,222,641 incorporated herein by reference are usable for this purpose.

Behind the light sources 56, 57 and 58, there are reflectors 59, 60 and 61, for improved light efficiency. Respective light from the source 56, passes through the red filter 53 and the liquid crystal panel 50. The lens 62, magnifies and projects all energized portions of the liquid crystal panel 50, onto the screen 65, in the red color. Light from the source 57, passes through the green filter 54 and the liquid crystal panel 51 and is projected onto the same screen 65 by the lens 63, in the green color portions. Light from the source 58, passes through the blue filter 55, then the liquid crystal panel 52 and, via the lens 64, is projected onto the screen 65, creating the blue composite parts of the image or picture. The mixture of the three colored composites on the screen 65, creates a multicolor image or picture of high resolution of the colors. Colored pictures can also be obtained by only two projecting systems, with two colors: orange and cyan. The best results can be obtained with four projecting systems of the colors, red, green, blue and white. In this case the white light system would be provided with a gray filter. Were a two color system to be provided, the filter 55, for example, could pass white light, that is to be a "gray" filter and the panel 52 would have a variable intensity white image thereon. Using opaque projection methods (by mirrors), reflective liquid crystal displays can be realized. Using mirrors or prisms, the 3-way projection system can be realized with a single lens, but with somewhat lesser light efficiency.

Figure 2:
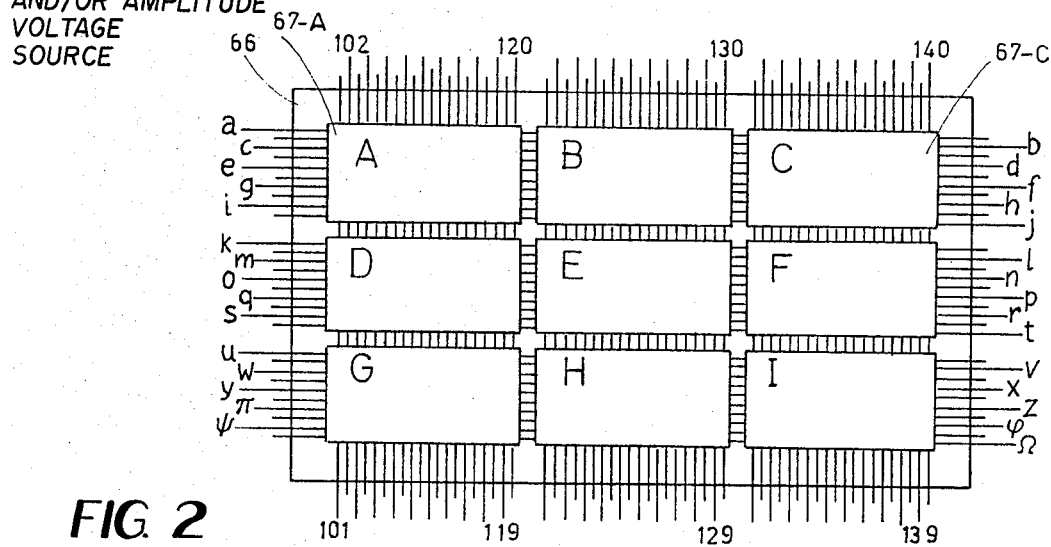
FIG. 2 shows a very large electronically controlled slide, built as an array of many very small liquid crystal cells, which is suitable for multiplexing.

According to a preferred embodiment of the present invention, a new component, a large liquid crystal display (LLCD) is proposed, as shown in FIG. 2. This liquid crystal display is suitable for high capability of information and rapid switching. The display as shown in FIG. 2 is formed from many very small liquid crystal cells 67-A, 67-B, 67-C, 67-D, 67-E, 67-F, 67-G, 67-H and 67-I, (in practice many more cells will be used) and assembled on one common transparent surface 66, which can be made from glass or any kind of plastic. All cells are connected together with any kind of plastic. All cells are connected together with transparent conductors, as it is shown in FIG. 2. It is clear, that other techniques to provide connections are possible. Small liquid crystal cells can be produced with very small spacing between the two pieces of glass; this results in rapid switching times particularly suitable for multiplexing. The gaps between the individual cells can be made sufficient small and in result not visible from an usual distance. If the liquid crystal cells are assembled on a surface of transparent plastic there is an additional advantage; the resulting structure is not fragile, is robust and can be made of virtually unlimited size. In spite of this the structure will not manifest known shortcomings, as Newton's rings or disclosed areas. Moreover, the structure will be suitable for rapid switching, thus providing a solution of multiplexing large liquid crystal panels. The switching time can be additionally shorted by warming up the liquid crystal panels near to the high end of their operation temperature, about 60° C.–80° C. It can be done, as illustrated in FIG. 1, by a blower 68, which has a warm up element 69 and a thermostat 70. Good results can be expected by energizing the liquid crystal panels with higher voltages, also by n-way multiplexing and interlacing methods.

Figure 3:
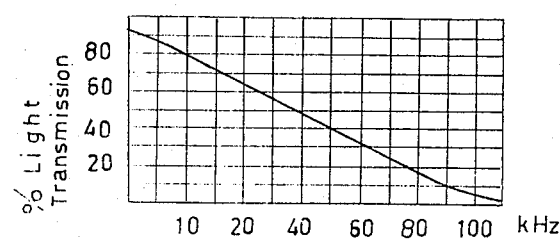
FIG. 3 is a graphical representation showing the relation between light-transmission of a liquid crystal display and frequency of the applied voltage useful in understanding a particularly desirable variant of the present invention in which modulation may be present.

For creating artistic pictures, like photographs it is very desirable to have a possibility of modulating the light intensity of all elements of the picture independently. According to the present invention such possibility has been achieved by a new discovered effect in liquid crystal devices, which is disclosed in FIG. 3. It was found, that the light intensity, which passes across a transmissive liquid crystal device (also the intensity of reflected light from a reflective liquid crystal display), falls with increases in the frequency of the applied voltages. As it is shown in FIG. 3, the relation between light transmission and frequency of the applied voltage is sufficiently linear, so first, a liquid crystal device can be utilized, as a frequency-to-light intensity convertor (F to L), or even, as an optically coupled isolator for very high output currents, needing only a small consumption of energy from the switching circuitry. It was also found, that by applying higher voltages to the liquid crystal display, the frequency-to-light transmission line, which is shown in FIG. 3, shifts to higher frequencies, this being very important for rapid light modulating or multiplexing. As shown broadly in FIG. 1, the liquid crystal panels 50, 51, 52 are connected respectively with variable frequency and/or amplitude voltage sources 71, 72 and 73 to provide the light intensity variations.

Thus, it is possible to modulate the light intensity passed across the liquid crystal means, by changing the frequency of the applied voltage. The light, can also be modulated by changing the amplitude of the applied voltage, between the threshold and saturation levels, but this method requires a non linear amplifier and is not as reliable.

In another variant, the large liquid crystal panel can also be provided without an additional common surface 66, as in FIG. 2. In this case, one of the glasses of the liquid crystal display, for example the front glass, with all front electrodes and connections, would be a common integral large glass and only the opposite electrodes would be disposed on small pieces of glass. It is to be appreciated that each individual liquid crystal element can be provided with its individual connections to circuits which provide variable frequency and/or amplitude voltages thereby allowing one to provide highly detailed images or pictures of variable brightnesses for different portions and/or colors thereof.

Referring now to FIG. 4, there is shown a system similar to that shown in FIG. 1 wherein the same reference numerals are used for the same or similar parts as shown in FIG. 1. The primary difference is that there is a fourth array or projection system for white light. This array comprises a lens 96, a liquid crystal panel 94 driven by a control 95 which can be a variable frequency and/or variable amplitude voltage source similar to the sources 71, 72 and 73. In addition, the array comprises a filter 93 which may or may not be needed for the white light projection, but is shown for indicating the versatility of the invention. A diffuser 92, similar to the diffusers 80, 81 and 82 for the other three color source arrays, is also provided between the light source 91 and the filter 93 or the liquid crystal panel 94. Finally, a reflector 90 is provided for operation in conjunction with a light source 91.

It will be obvious to those skilled in the art that various changes may be made without departing from the scope of the invention and the invention is not to be considered limited to what is shown in the drawings and described in the specification.

What is claimed is:

1. A multicolor electronically dynamic image or picture system for projecting enlarged, changeable or moving colored images or pictures without using any fixed image transparency; a liquid crystal, multiple individual color, on screen registry, electronic dynamic image generation system comprising:

a plurality of light sources;

a corresponding plurality of individual liquid crystal means positioned to receive light from said light sources, respectively; said plurality of liquid crystal means are transmissive liquid crystal means, and said liquid crystal means include means to modulate the light intensity which they transmit;

said light diffusing means positioned between said light sources and said liquid crystal means;

a corresponding plurality of electronic means for selectively individually energizing respective ones of said plurality of liquid crystal means each independently of the energizing of all of the others of said plurality of liquid crystal means solely to effect respective portions of an image or picture to be projected, the system being free of any fixed image transparency; said plurality of electronic means comprise respective voltage supply means coupled to respective ones of said liquid crystal means for energizing same with voltages of changeable frequency to thereby modulate the light intensity of composite elements of the image or picture independently;

a corresponding plurality of filters at least two of which pass different colors to color respective corresponding light beams which are to pass respectively through said liquid crystal means from said light sources;

screen means; and at least a corresponding plurality of projecting means for projecting the light beams passed through each respective one of said liquid crystal means, said light diffusing means, and said color filter onto said screen means in registry with each other;

whereby an electronically generated enlarged, real, changeable or moving color image or picture made up of the projected individual single color electronically generated images from each said respective set of said liquid crystal means, said light diffusing means, and said color filter can appear on said screen means without the use of any fixed image transparency.

2. An image or picture system according to claim 1, wherein said projecting means comprises three projecting devices one each for the colors red, green and blue.

3. An image or picture system according to claim 1, wherein said projecting means comprises four projecting devices one each for the colors red, green, blue and white.

4. An image or picture system according to claim 1, wherein said projecting means comprises at least two projecting devices one each for the colors orange and cyan.

5. An image or picture system according to claim 1, wherein said projecting means comprise lens means.

6. An image or picture system according to claim 5, wherein said lens means comprise a plurality of lenses, each lens of said plurality of lenses being operatively associated with a respective one of said filters.

7. An image or picture system according to claim 1, and warm-up means for said liquid crystal means, said warm-up means comprising blower means, a heating element and a thermostat.

8. An image or picture system according to claim 1, wherein said liquid crystal means are in the form of an array of liquid crystal cells assembled on a single common transparent surface.

9. An image or picture system according to claim 8, wherein the said common transparent surface is a plastic material.

10. An image or picture system according to claim 8, wherein said common transparent surface is one of two liquid crystal plates, one of which is integral and the second plate is assembled from a plurality of relatively small pieces of glass.

11. An image or picture system according to claim 1, wherein said plurality of electronic means comprise respective voltage supply means coupled to respective ones of said liquid crystal means for energizing same with voltages to effect optical isolation at given voltage levels.

* * * * *